United States Patent [19]
Bonsall et al.

[11] Patent Number: 5,865,766
[45] Date of Patent: Feb. 2, 1999

[54] MULTICHANNEL, MULTIPURPOSE SAMPLE COLLECTION AND DRUG DELIVERY SYSTEM FOR LABORATORY ANIMALS

[75] Inventors: Robert Wingfield Bonsall, Stone Mountain; Milburn Spencer Emery, Marietta; Jay Michael Weiss, Atlanta, all of Ga.

[73] Assignee: Emory University, Atlanta, Ga.

[21] Appl. No.: 781,690

[22] Filed: Jan. 10, 1997

[51] Int. Cl.⁶ ..................................................... A61B 5/00
[52] U.S. Cl. .......................................... 600/578; 600/581
[58] Field of Search .................................... 600/578, 579, 600/581; 604/53, 113, 114, 120, 186, 207

[56] References Cited

U.S. PATENT DOCUMENTS

| | | | |
|---|---|---|---|
| 3,749,113 | 7/1973 | Isreeli et al. . | |
| 4,006,743 | 2/1977 | Kowarski | 600/581 |
| 4,658,655 | 4/1987 | Kanno | 600/578 |
| 4,694,832 | 9/1987 | Ungerstedt . | |
| 4,715,413 | 12/1987 | Backlund et al. . | |
| 4,838,855 | 6/1989 | Lynn | 600/578 |
| 4,854,322 | 8/1989 | Ash et al. | 600/581 |
| 5,325,867 | 7/1994 | Skarbal et al. | 600/578 |
| 5,386,834 | 2/1995 | Schwarz . | |
| 5,441,481 | 8/1995 | Mishra et al. . | |

OTHER PUBLICATIONS

Abercrombie Finlay, "Monitoring extra–cellular norepinephrine in brain using in vivo microdialysis and HPLC–EC", In T.E. Robinson and J.B. Justice (Eds.) *Microdialysis in the Neurosciences,* Elsevier, Amsterdam, pp. 253–274 (1991).

Bonsall, et al., "Corticosterone levels in rat brain microdialysates following exposure to noise stress or to lipopolysaccharide (LPS)", *Neurosci. Soc. Abstr.* 22 (1996).

Kosobud, et al., "Behavioral associations of neuronal activity in the ventral tegmental area of the rat," *J. Neurosci.* 14:7117–7129 (1994).

Lemon, R. *Methods for Neuronal Recording in Conscious Animals.* IBRO Handbook Series: Methods in The Neurosciences, vol. 4 (A.D. Smith ed.) John Wiley and Sons, N.Y. (1984).

Matsumura, et al., "A novel apparatus that permits multiple routes for infusions and body fluid collections in a freely–moving animals," *J. Neurosci. Methods* 57:145–149 (1995).

Pearce, et al., "A method of remote physiological monitoring of a fully mobile primate in a single animal cage," *Laboratory Animals,* 23:180–187 (1989).

(List continued on next page.)

*Primary Examiner*—Max Hindenburg
*Attorney, Agent, or Firm*—John S. Pratt; Kilpatrick Stockton LLP

[57] ABSTRACT

A multichannel, multipurpose sample collection and drug delivery system for laboratory animals includes several sampling and/or infusion devices mounted on a powered turntable above the cage but out of the animal's sight. Probes are constructed using a unique four-channel design: this permits (a) the periodic infusion of drugs without the possibility of artifacts due to pressure shocks and (b) the addition of preservatives to the sample at the site of its collection. A simplified sample collection device stores samples in a coil of PTFE tubing, and a constant-pressure perfusion system serves microdialysis probes. Further advantageous embodiments of the present invention include (a) systems to measure feeding, drinking and motor activity; (b) automated and unattended systems for blood withdrawal and drug delivery; (c) a data link with a personal computer to provide for data acquisition and more sophisticated control; (d) an improved method for sampling extracellular concentrations of neuropeptides, which are difficult to measure with conventional microdialysis; (e) the capability to perform electrophysiology simultaneously with microdialysis (or other sampling methods); and (f) the adaptation of the system for use with animals larger or smaller than the rat.

18 Claims, 13 Drawing Sheets

OTHER PUBLICATIONS

Weiss, "Stress–induced depression: critical neurochernical and electrophysiological changes," In J. Madden, IV (Ed.) *Neurobiology of Learning, Emotion and Affect,* Raven Press, New York, pp. 123–154 (1991).

Weiss, "Hypothesis linking the noradrenergic and dopaminergic systems in depression," *Depression 3*: 225–245 (1996).

Weiss, et al., Effects of chronic exposure to stressors on avoidance–escape behavior and on brain norepinephrine, *Psychosom. Med. 37*:522–533 (1975).

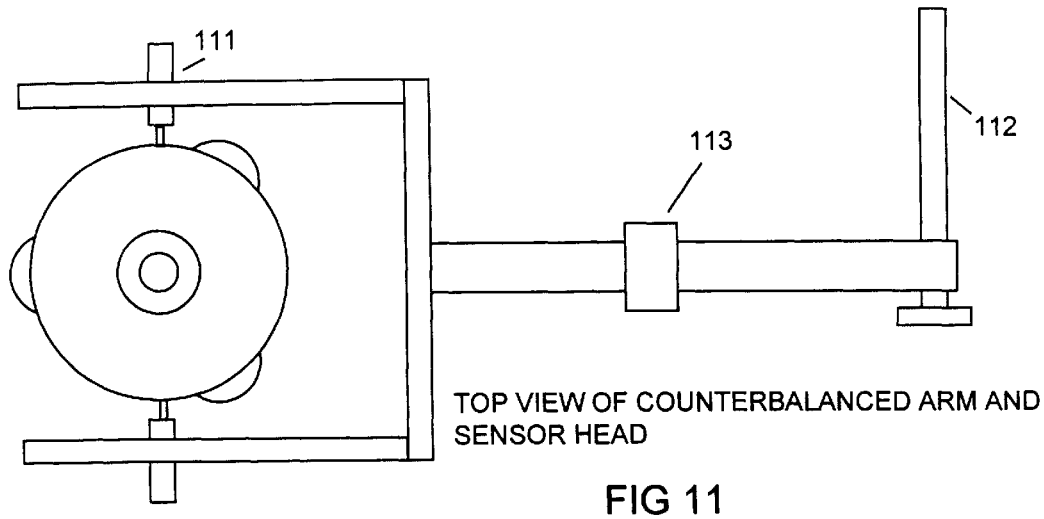
TOP VIEW OF COUNTERBALANCED ARM AND SENSOR HEAD
FIG 11
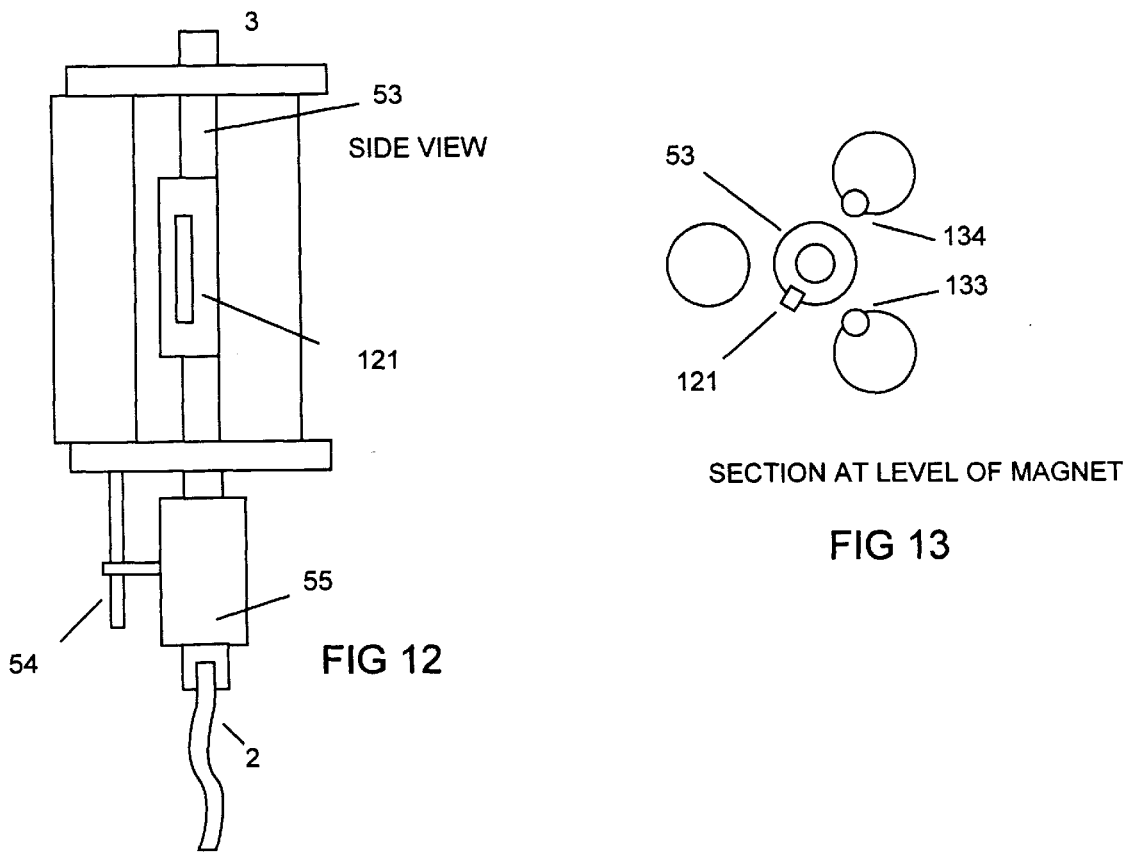
SIDE VIEW
FIG 12
SECTION AT LEVEL OF MAGNET
FIG 13

5,865,766

MULTICHANNEL, MULTIPURPOSE SAMPLE COLLECTION AND DRUG DELIVERY SYSTEM FOR LABORATORY ANIMALS

BACKGROUND OF THE INVENTION

The present invention relates generally to sample collection and drug delivery systems, and more particularly to sample collection and drug delivery systems for freely-moving laboratory animals.

Most animal studies in physiology, and many in pharmacology and basic biology, require samples (e.g. blood or cerebrospinal fluid (CSF)) to be removed for analysis, some sort of electrical activity to be monitored, and/or drugs to be administered at precise times. If such experiments are to be conducted in alert, freely-moving animals, which is generally preferred, some sort of tether encasing the fluid or electrical connections to the animal is normally required. To allow improved freedom of movement, a swivel is generally provided between the animal and the sampling or infusion device. Multichannel electrical swivels may be reasonably satisfactory (although mercury-based devices are hazardous), but fluid swivels are often problematical, being stiff and subject to leaks and blockages. This restricts the animal's movement and requires frequent experimenter intervention to remove twists from the tether. The result is that the ideal of a stress-free environment for the animal under study is difficult or impossible to achieve with currently available equipment.

There is no commercially available equipment that provides the capability of multichannel fluid sampling and/or administration in alert, tethered animals. However, an alternative method for achieving multichannel sampling has been published (See Matsumura, H., Kinoshita, G., Satoh, S., Osaka, T. and Hayaishi, O., "A novel apparatus that permits multiple routes for infusions and body fluid collections in a freely-moving animal," J. Neurosci. Methods 57 (1995) 145149). In that system, the rat itself, rather than the supporting equipment, is moved on a turntable to reduce the twisting of the tether. This approach is undesirably stressful to the animal and presents other problems.

The present invention is therefore directed to the problem of developing a sample collection and drug delivery system with a unique multichannel capability for use with alert, freely moving laboratory animals, without putting any additional stress on the laboratory animal.

SUMMARY OF THE INVENTION

The present invention solves this problem by mounting the sampling and/or infusion devices on a powered turntable above the cage but out of the animal's sight. Rotation of the tether as the animal moves is detected by magnetic switches which cause the turntable to turn in the direction taken by the animal. By this means, the need for troublesome fluid or electrical swivels is entirely eliminated, and the animal experiences almost zero torque on the tether.

Because it is the swivel that otherwise limits the number of fluid or electrical connections in traditional systems, eliminating the swivel removes this constraint on the number of connections. As a result, it is now possible to place multiple probes in alert, freely moving animals in order to sample several brain regions at the same time, such as to make simultaneous measurements of monoamine release in the ventral tegmental area and in its dopaminergic projection regions. Previously, multiple simultaneous measurements at different sites could only be achieved by anesthetizing or constraining the animal, which was not satisfactory.

Moreover, probes can now be constructed using a unique four-channel design: this permits (a) the periodic infusion of drugs without the possibility of artifacts due to pressure shocks and (b) the addition of preservatives to the sample at the site of its collection.

The present invention also includes a simplified sample collection device in which samples are stored in a coil of PTFE tubing, and a constant-pressure perfusion system for microdialysis probes.

Further advantageous embodiments of the present invention include (a) systems to measure feeding, drinking and motor activity; (b) automated and unattended systems for blood withdrawal and drug delivery; (c) a data link with a personal computer to provide for data acquisition and more sophisticated control; (d) an improved method for sampling extracellular concentrations of neuropeptides, which are difficult to measure with conventional microdialysis; (e) the capability to perform electrophysiology simultaneously with microdialysis (or other sampling methods); and (f) the adaptation of the system for use with animals larger or smaller than a rat.

One advantageous embodiment of the apparatus for coupling instrumentation to the animal employs a rotatable platform with the instrumentation mounted on the platform. Thus, the tether is connected both to the laboratory animal and the instrumentation. In addition, a rotation compensator detects rotation of the tether and controls rotation of the platform based on the detected rotation.

In this embodiment, the rotation compensator uses a magnet mounted on the tether, a power source connected to the rotating platform, and a pair of magnetic switches mounted in a common plane with the magnet so that rotation of the magnet away from one magnetic switch is towards the other magnetic switch. A second power source is connected to the magnetic switches, with an impedance network in parallel with the rotating platform. A pair of relays are used to switch the polarity of the current from the power source to the motor based on the detected rotation.

Another embodiment of the present invention employs a coupling between the tether and the instrument. The coupling has a tube through which the tether passes, a magnet mounted on the tube, and a rotation stop jutting out from the tube, which limits the amount of the tube's rotation.

Yet another advantageous implementation of the turntable apparatus of the present invention includes a force minimizing mechanism that adjusts the length of the tether in the cage to account for slack created by animal movement. When the animal moves closer to the tether the length adjustment pulls on the tether to reduce the excess length of the tether within the cage. When the animal moves away from the tether i.e., pulls on the tether, the length adjustment mechanism lets the length of the tether increase to provide freedom of movement for the animal.

One implementation of the force minimizing mechanism uses a balance arm to which one end of the tether is mounted, and a counterweight connected to the balance arm via a pair of pulleys and a cable. As the animal moves, the force on the tether either increases or decreases, which causes the counterweight to move up and down in reaction to the change in force, respectively, which lowers or raises the balance arm, causing the length of the tether in the cage to lengthen or shorten, respectively.

To fine tune the acceleration and deceleration of the turntable, one advantageous embodiment of the turntable employs an array of magnetic sensors providing positional information about the tether, a stepper motor drive controlling the rotatable platform, and a microcomputer controlling the stepper motor drive based on the positional information.

In this case, the apparatus includes a means for altering the step frequency of the stepper motor, so that smoother acceleration and deceleration is achieved and a maximum rotational speed can be made proportional to the displacement. One possible implementation of this means is a microcomputer to control the step frequency of the stepper motor drive.

Another alternate embodiment of the turntable apparatus includes a cage for containing the animal, and the rotatable support mechanism is mounted above the cage. In this embodiment, a computer compiles reports regarding movement by the animal and infrared transmitters shine infrared beams through the cage which are detected by infrared sensors mounted around the cage. These sensors are coupled to the computer and indicate when the beams are interrupted. As a result, these beams contain information about the animal regarding horizontal movement, rearing, and access to food and water, which information is passed to the computer. The computer then outputs reports correlating activity data with rotational activity data detected by rotation of the rotatable support mechanism.

According to the present invention a method for coupling a tether to a laboratory animal includes detecting a rotation of the tether, adjusting an orientation of the tether relative to the animal based on the detected rotation, and modifying the length of the tether (or its projection into the cage) to account for movement of the laboratory animal. Additional advantageous steps include mounting a slack adjustment device on a rotatable platform, and rotating the platform according to the detected rotation simultaneously with changing the slack in the tether.

Another aspect of the present invention is a sample collection device. This novel device includes a coil with one end connected to the sampling site, and a pump controlled by a timer, which at preset intervals draws a sample into the coil followed by a bubble of gas to keep successive samples separate. Since the device operates automatically, it is desirable to include a cooling device surrounding the coil to prevent the samples from becoming unusable. One particularly advantageous cooling device is Peltier cooling device, or a reverse thermocouple cooling system. A computer controls the cooling device based on information provided by a thermistor sensor.

For those samples that might be tainted by air, the present invention employs a gas reservoir at one end of the coil. The gas source can use any of the noble gases, or a mix of them.

To control the size of the bubbles, even after many samples, the present invention uses a solid-state delay relay maintaining successive samples separate by introducing air bubbles at regular intervals. The relay is controlled by a computer, which controls the frequency of bubble introduction. Sensors detecting the size of the bubble are used to accurately introduce bubbles into the coil.

An automated fluid sampling system according to the present invention for obtaining samples from a living organism employs the coil, and an indwelling cannula attached to the living organism. The indwelling cannula has a main cannula with a tip, a body and an concentric inner cannula. One syringe is attached to the one end of the coil, another syringe is filled with an anticoagulant and is attached to the indwelling cannula via the concentric inner cannula. The second syringe delivers the anticoagulant via the concentric inner cannula to a point about 1 mm from the tip of the main cannula. Yet another syringe is attached to the indwelling cannula via the body of the indwelling cannula, and delivers a preservative solution into the body of the cannula. An external computer transmits an activation signal to three stepper motors, which operate the three syringes. A microcomputer receives the activation signal from the external computer and controls the three stepper motors according to the activation signal.

In the above system, it is particularly advantageous if the system uses the following withdrawal sequence. First, the sample syringe withdraws a sample at a rate faster than the delivery rate of the anticoagulant and preservative, whereby a total volume withdrawn=volume of preservative+volume of anticoagulant+internal volume of cannula+sample volume. To backfill the cannula, the sample syringe is withdrawn at a withdrawal rate=coagulant delivery rate, wherein total volume=internal volume of cannula. To perform an anticoagulant drip, there is no main syringe or preservative syringe motion, and the anticoagulant flow rate=about 1 $\mu$liter per minute by intermittent pulsing of the appropriate stepper motor. In this case, samples are stored in the sample coil between bands of anticoagulant.

An automated drug delivery system for delivering a drug to a living organism according to the present invention employs an indwelling cannula attached to the living organism and one end of the coil, with a tee coupling at one end. Two computer controller stepper motors activate the two syringes, one of which is maintained at a cold temperature and contains a solution of the drug and the other syringe contains normal saline. Both syringes are connected to the cannula by the tee. In this instance, delivery sequence is: as follows. First, a required volume of drug solution is delivered into the cannula, followed by delivery of saline into the cannula equivalent to 110% of the internal volume of the cannula. In this embodiment, the cannula has a diameter less than approximately 40 $\mu$m, and the computer controls the flow rates to be in the range of approximately 1 $\mu$liter per minute.

Another aspect of the present invention includes an apparatus for collecting a fluid sample from a living organism and for providing drugs to the living organism. This apparatus includes a membrane attached to the living organism, and a multichannel microdialysis probe connected to the membrane. The first channel delivers perfusate to the sampling site on the living organism and extends into the membrane. The second channel delivers a preservative to mix with the fluid sample immediately after the fluid sample enters the probe. A third channel receives the fluid sample from the living organism, and has a relatively wide bore as compared to the other channels. A fourth channel provides a means injecting a drag into the perfusate inflow in order to deliver the drag to the animal via the microdialysis membrane.

By connecting a coil of flexible tubing to the third channel of the microdialysis probe, and the time controlled pump of the present invention to one end of the coil, one obtains a unique sampling system according to the present invention. In this system, at preset intervals controlled by the timer, the pump draws a sample into the coil followed by a bubble of gas to keep successive samples separate.

Another aspect of the present invention is an apparatus for supplying liquid to a probe. This apparatus includes a pressurized container with a pressure sealed exit port, at least one reservoir of liquid, at least one tube extending into the liquid in the reservoir and exiting the container via the sealed port, which is attached to the probe at its other end. In this case, the tube has a very narrow inner diameter so that the volume of the container is several orders of magnitude greater than the volume of the preservative. The tube also has a predetermined length greater than approximately 40 millimeters and the container has a pressure less than approximately 15 pounds per square inch.

A multichannel perfusion device according to the present invention for supplying preservative to a plurality of microdialysis probes has several tubes attached to the probes, each tube has a predetermined and fixed length, and a relatively small diameter. Several reservoirs of preservative are located in the container. Each of the tubes extends into the preservative in one of the reservoirs. The container is pressurized at a low pressure has a pressure sealed exit port through which the tubes exit the container, whereby the pressure of the container relative to the length and diameter of the tubes limits the pressure of the fluid in the tubes. In this device, it is particularly advantageous if the pressure of the container is between approximately 5 and 15 psi, the length of the tubes is between approximately 40 and 300 mm, the diameter of the tubes is approximately 40 $\mu$m, the flow rate from the tubes is less than approximately 4 $\mu$liters per minute, and the volume of the container relative to the volume of the preservative being discharged is such that a maximum pressure that can exist in the tubes is less than approximately 10 pounds per square inch.

BRIEF DESCRIPTION OF THE DRAWINGS

FIG. 11 shows a top view of the counterbalanced arm and sensor head.

FIG. 12 depicts a side view of the rotation detector.

FIG. 13 depicts a section of the side view of FIG. 12.

DETAILED DESCRIPTION

The multichannel automatic sample collection and drug delivery system of the present invention has several potential applications. The general aim has been to produce a highly reliable automated multichannel sample collection system at a cost well within that of current commercial equipment.

One part of the present invention, i.e., the turntable, provides an elegant solution to many of the problems associated with physiological or pharmacological studies of freely-moving laboratory animals and provides a significant advantage in any experiment in which animals must be tethered in order to obtain samples of body fluids, administer drugs on a precise schedule or measure electro-physiological responses. Moreover, because the apparatus of the present invention permits free movement of the animal under study, it has a much broader range of applications than the conventional equipment that it is designed to replace. For example in microdialysis, which is performed in an estimated 500 to 1000 laboratories, many studies are still performed in anesthetized animals when alert, freely moving animals are almost always preferred. The microdialysis probes and tethers of the present invention can be used in social situations where commercially available equipment (which is not designed to be nibble-proof) is unsuitable. In fact, almost all microdialysis studies on rats have been performed on singly-housed animals even though this rodent is a social animal. The isolation of social animals may act as a stressor, and this may have influenced the outcome and interpretation of some studies.

Another important aspect of physiology that has been largely ignored because of its inconvenience has been the study of circadian variations in the response to stress or drug administration. The fully automatic turntable makes such studies very easy to perform without disrupting the experimenter's own circadian rhythms.

Moreover, the application of the turntable device is not limited to those fields traditionally reserved for microdialysis. For example, in pharmacodynamics, the turntable could be used to assess drug metabolism and tissue penetration in multiple sites simultaneously in chronic as well as acute studies. In endocrinology, local differences in hormone metabolism can have drastic effects on their physiological actions. Chronic, simultaneous sampling from multiple tissue sites and brain regions could illuminate many problems concerning the control of circadian and seasonal rhythms feedback effects and "end organ insensitivity."

Turntable

Figure 1:
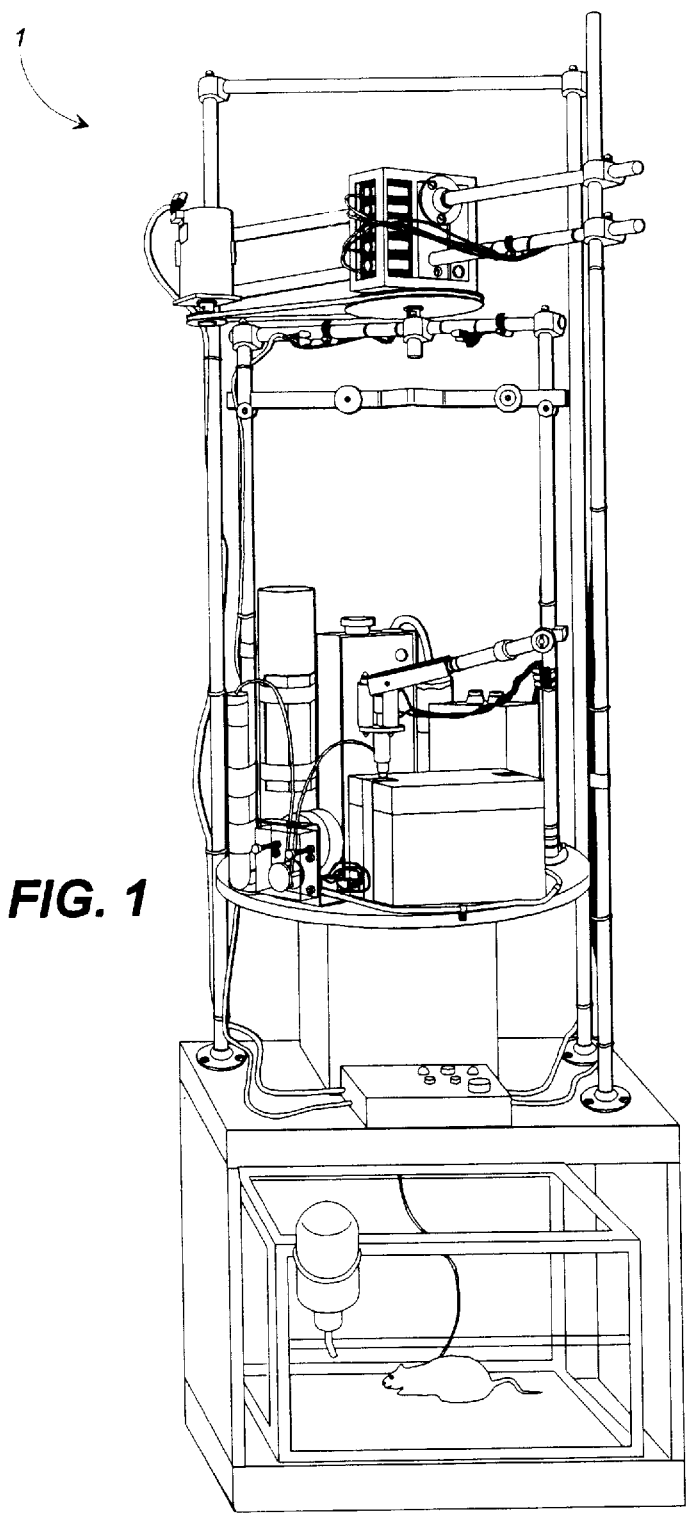
FIG. 1 depicts a diagram of a turntable mounted on a cage with a tethered rat according to the system of the present invention.
Figure 2:
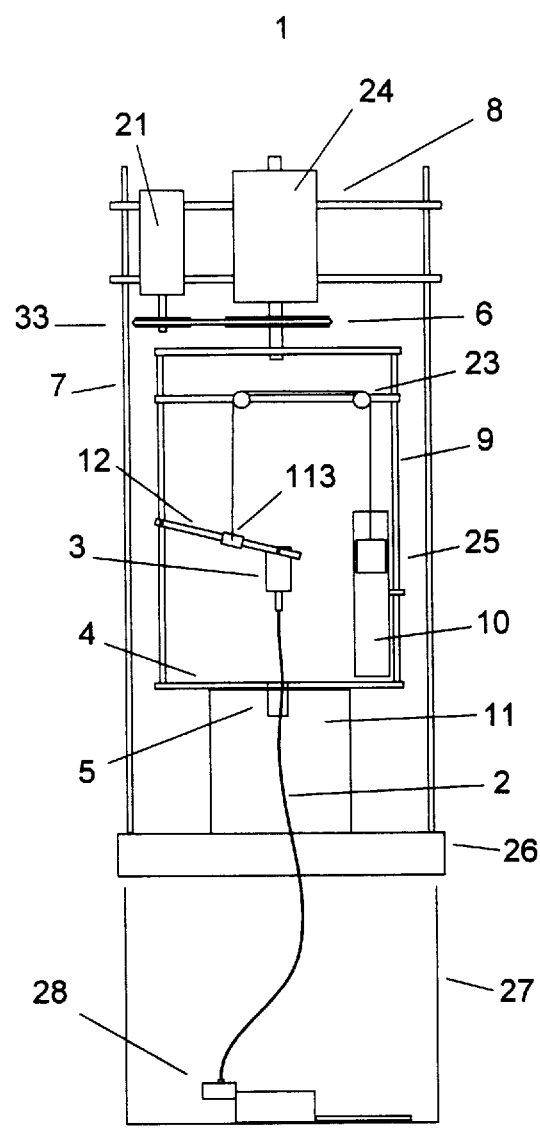
FIG. 2 is a schematic of the turntable and cage apparatus of the present invention.

A diagram of three turntable apparatuses 1 mounted on a triple cage with three tethered rats is shown in FIG. 1, and a schematic of a single turntable apparatus is given in FIG. 2. A close-up view of the schematic shown in FIG. 2 from the base up, without the tether, is shown in FIG. 15.

Each turntable apparatus consists of a base 26 supporting an outer frame 7, 8 that holds the drive motor 21 and electrical swivel 24, and the turntable itself 4 which is mounted on a raised platform 11 above the base 26 in order to distance it from the rat 28. The tether 2 coming from the rat 28 runs upward through a hole 5 in the center of the turntable 4 and attaches to a counterbalanced arm 12 at point 113. Rotation of the tether 2 produced by movement of the rat 28 is detected by magnetic switches 133, 134 (see FIGS. 12 and 13) that activate the drive motor 21 to turn the turntable 4 in the direction of the movement of the rat 28.

Figure 3:
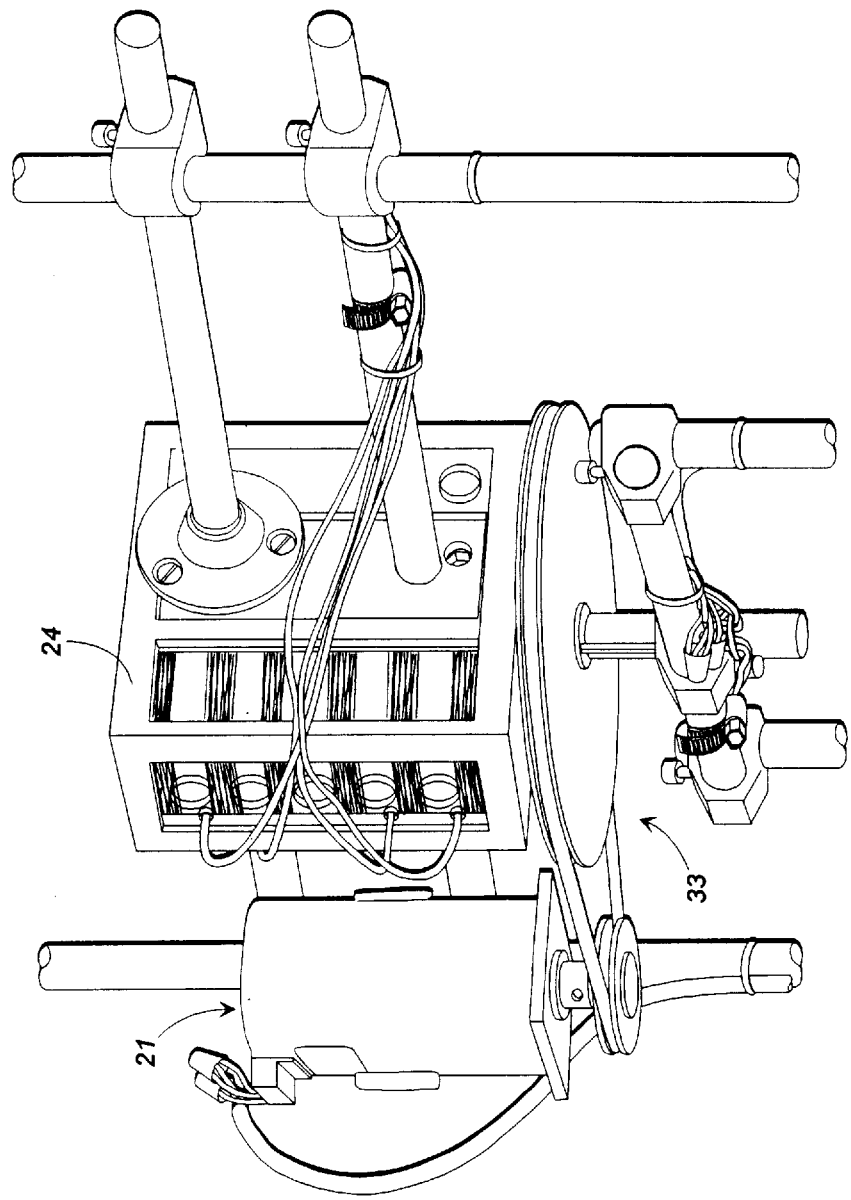
FIG. 3 depicts a close-up of the five-channel electrical swivel and drive mechanism used in the apparatus of the present invention.

A close-up of the five-channel swivel 24 and drive mechanism 33 is shown in FIG. 3. The motor 21 consists of a fractional horsepower reversible synchronous motor with a 3:1 step-down belt drive 33 that provides a 20 rpm drive to the turntable 4. The electrical swivel 24 employs carbon brushes and also serves as the upper bearing of the turntable 4. The five electrical channels consist of AC live, neutral and ground to the turntable and the CW and CCW AC connection to the synchronous motor 21 from relays 136, 137 (see FIG. 14) mounted on the turntable 4. Further electrical and fluid swivel connections could be provided by using a hollow drive shaft in the swivel 24. Alternative means of communicating with the turntable data connections might be to use the AC as a carrier or to use infrared signaling.

Figure 4:
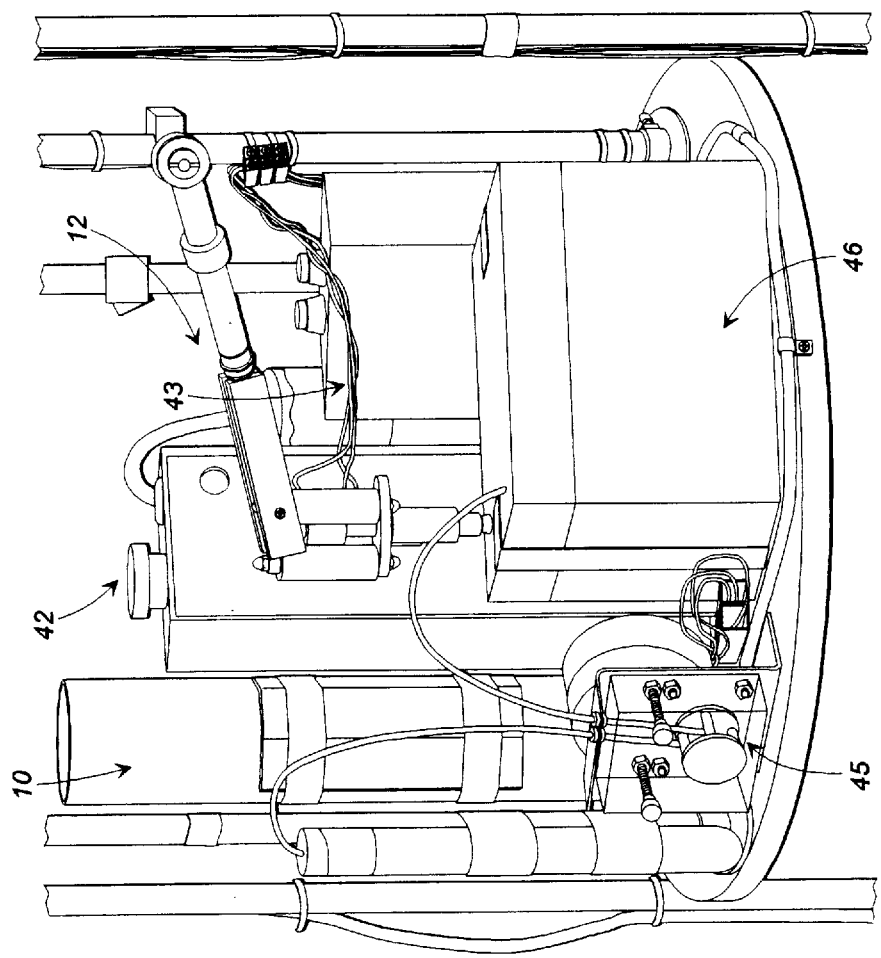
FIG. 4 shows one embodiment of the apparatus of the present invention, specifically including pumps and sample collectors of the present invention mounted on the turntable of the present invention.
Figure 14:
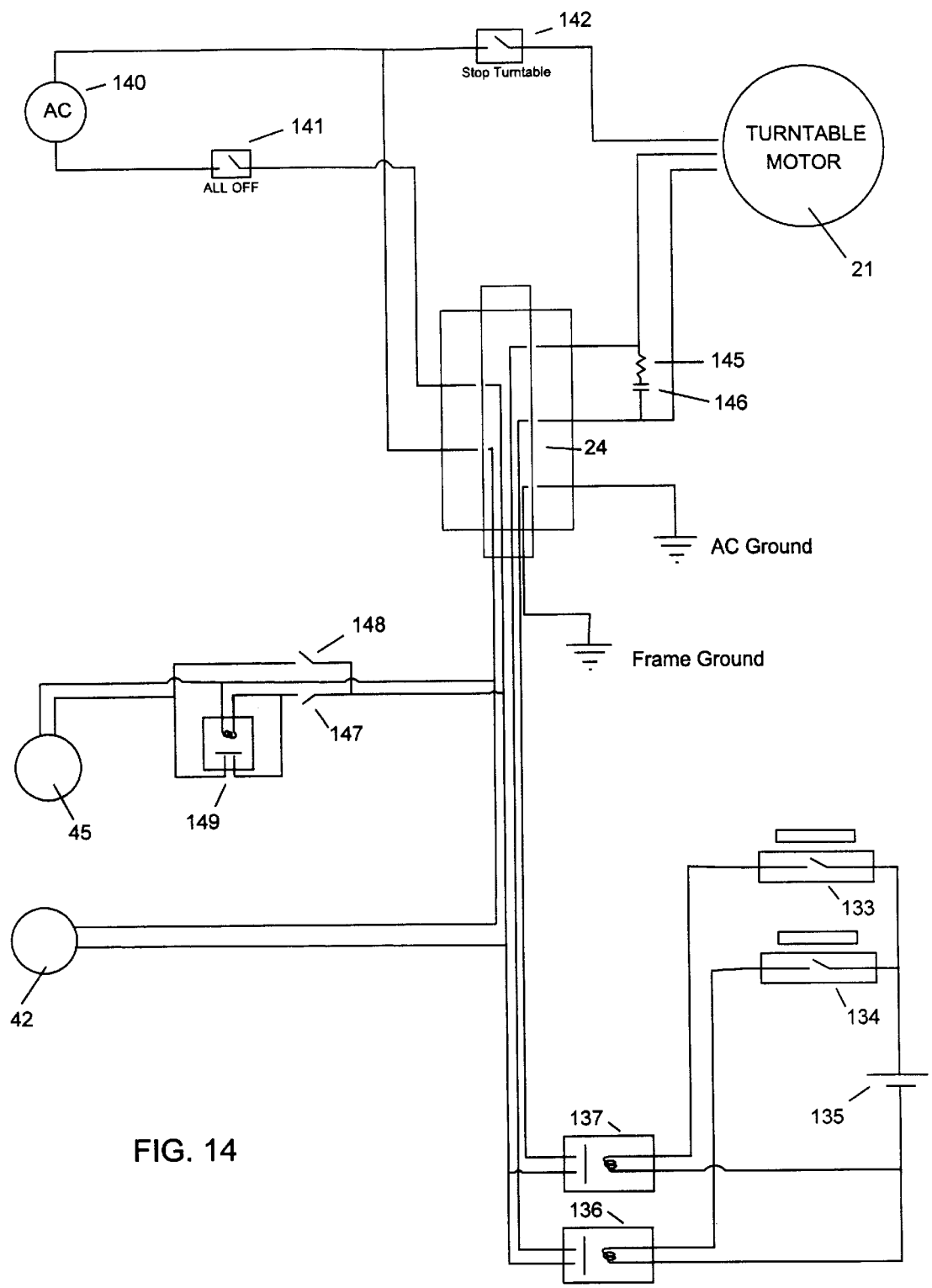
FIG. 14 depicts the electrical schematic of the microdialysis turntable according to the present invention
Figure 15:
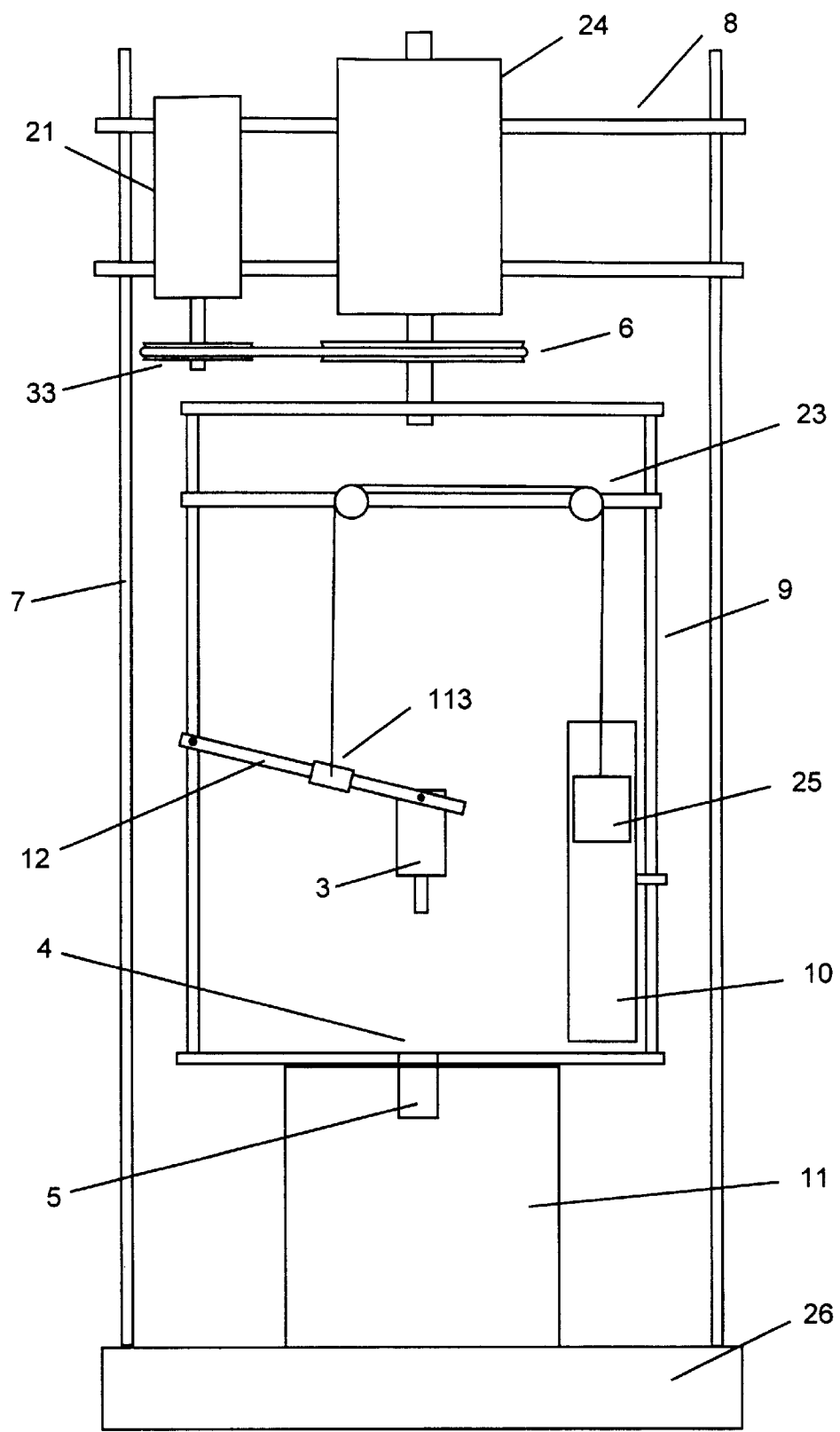
FIG. 15 depicts another close-up view of the turntable system shown in FIG. 2.

The rotating surface of the turntable 4 is illustrated in FIG. 15. At its center is a one-inch hole 5 fitted with a brass tube. The tether 2 runs through this brass tube 5 from the cage 27 below. The tube 5 revolves in a Rulon bearing mounted in the base platform 11. The counterbalanced arm 12 that connects to the tether 2 via the sensor head 3 (see FIG. 5) is attached to a counter-weight 25 by means of two overhead pulleys 23. The weight 25 is constrained within the plastic tube 10. The AC-powered syringe pump 42 shown in FIG. 4 is a commercially available model mounted in a vertical position to save space. An improved and simplified perfusion system 90 for microdialysis is included (see FIG. 9) in an alternate embodiment. The control box 43 contains solid-state relays 136, 137 (refer to FIG. 14) that activate the synchronous motor 21, a DC power supply 135 for the magnetic switches 133, 134 and a commercial timer module 149 to control the sample-collection system by activating the peristaltic pump 45 at preset intervals.

Figure 5:
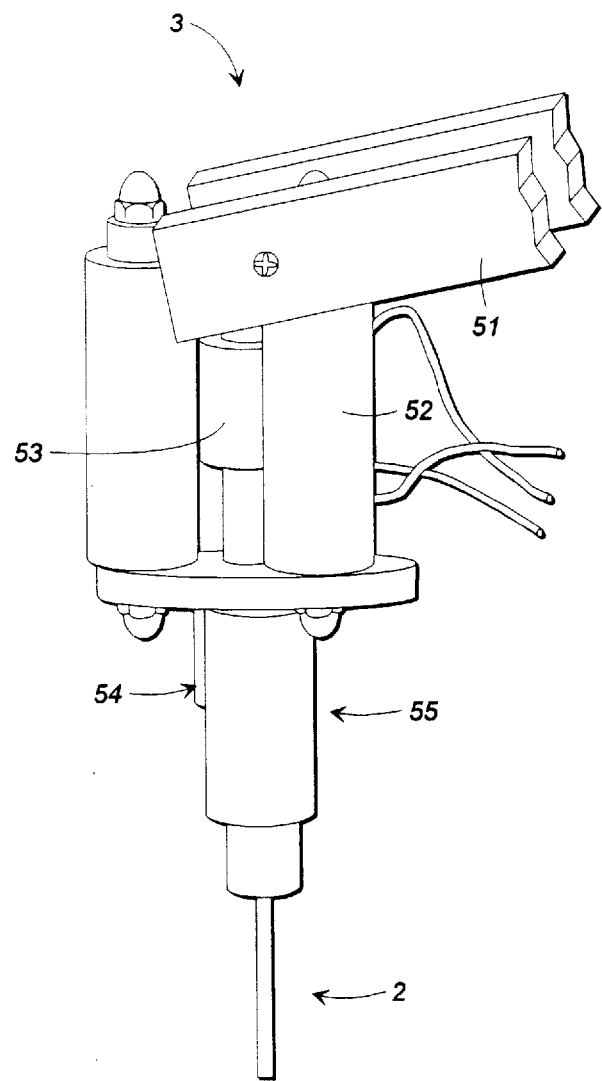
FIG. 5 depicts a detail of the sensor head used in the apparatus of the present invention.

FIG. 5 shows the sensor head 3 that detects rotational movement of the tether 2. The head 3 is mounted on the end 51 of the counterbalanced arm 12 by a pair of pivots. The tether 2 is attached to the rotor 53 which consists of a brass tube through which infusion lines and sample collection lines from the rat 28 are routed. A magnet 121 (see FIG. 13) is mounted in a plastic holder 52 on the brass tube 53. The brass tube 53 is fitted with upper and lower ball bearings, and a stop 54 constrains its rotation to about 270°. At the maximum counter-clockwise extent of its movement, the magnet 121 (see FIG. 13) on the rotor 53 is aligned with one of the two magnetic switches 133 (FIG. 13). At the maximum clockwise direction, the magnet 121 is aligned with the second magnetic switch 134. The sensitivity of the system (i.e. the amount of rotational movement of the rotor 53 needed to trigger the magnetic switches 133, 134) can be adjusted by moving the magnet holder 52 up or down the rotor shaft 53.

The turntable system 1 of the present invention is extremely reliable. Some further advantageous embodiments of the present invention include the following. For example, for simplicity of design, one embodiment of the turntable is powered by an AC synchronous motor controlled by relays. Even using an elastomeric drive belt, this can produce a rather abrupt acceleration and deceleration of the turntable. One alternative embodiment includes two changes: (a) an array of magnetic sensors to provide more precise positional information and (b) a stepper motor drive controlled by a PIC computer chip. By altering the step frequency, smoother acceleration and deceleration is achieved and the maximum rotational speed can be made proportional to the displacement.

Sample Collection Device

Figure 6:
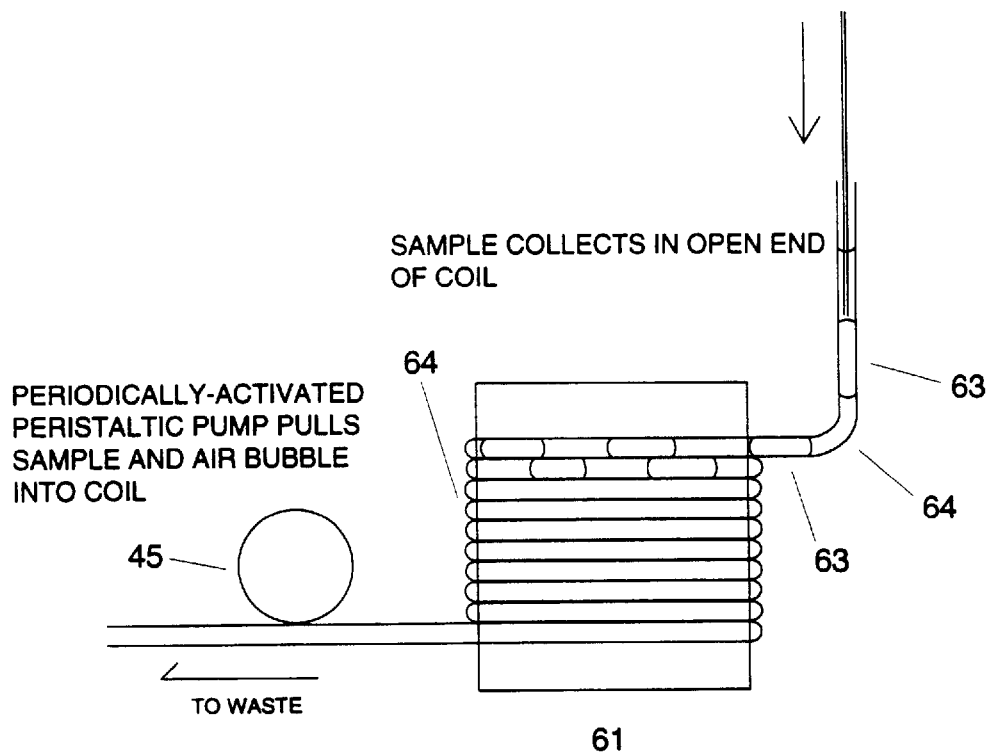
FIG. 6 depicts a sample collection coil of the present invention.
Figure 10:
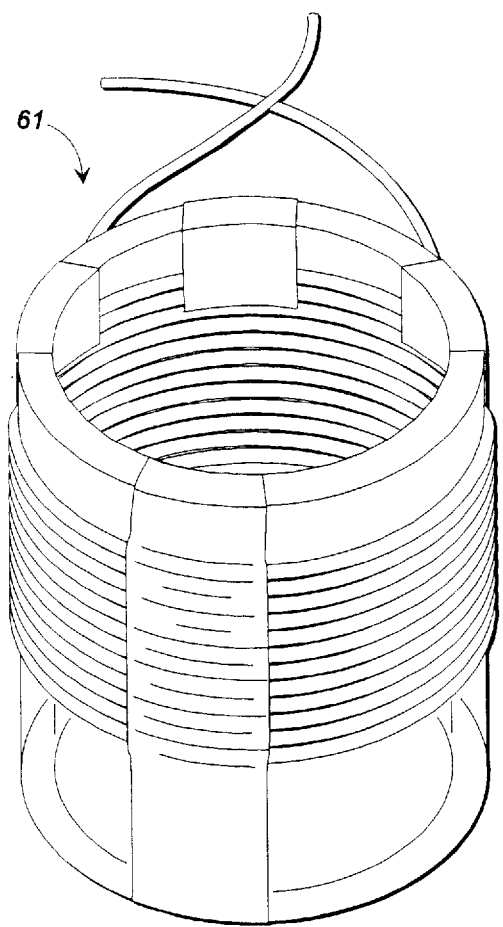
FIG. 10 shows one embodiment of the sample loop of the present invention.

The multichannel collection system of the present invention employs a unique device 61 for collecting samples, which is shown in FIG. 6. Another view of the sample coil is shown in FIG. 10. According to another aspect of the present invention, samples 63 are collected in a loop 64 of 16 Ga Teflon tubing (see FIG. 6) that is housed in an insulated box 46 (see FIG. 4). The peristaltic pump 45 draws an air bubble 62 into the sample loop 64 to keep samples 63 separate.

The new coil-based sample collector 61 of the present invention is much simpler than traditional designs in which the samples are stored in individual vials. It lends itself to miniaturization and could be used to advantage in a broad range of applications in which continuous sampling of small volumes of fluid is needed, including chromatography and electrophoresis. Advantages include low costs of fabrication and operation as well as protection of samples from evaporation losses and oxidation.

Samples are collected in the open end of a coil 64 of the tubing (see FIG. 6). At preset intervals controlled by a timer, the peristaltic pump 45 (FIG. 4) draws a sample 63 into the sample coil together with a bubble of air 62 to keep samples 63 separated.

In the current system, the sample coil is mounted in an insulated box 46 (FIG. 4) and kept cool with ice. This works well for about 24 hours. To make changing the sample coil 64 easier, an advantageous implementation of this invention employs a Peltier cooling system (i.e., a reverse thermocouple). In this case, temperature control is provided by a thermistor sensor attached to a PIC computer.

Another embodiment incorporates a helium reservoir at the open end of the coil so that oxygen-sensitive samples are separated by a bubble of inert gas instead of air. Any of the noble gases can be substituted for helium, if necessary. For certain applications nitrogen may be used.

According to the present invention of the sample collector, samples are separated by air bubbles introduced at regular intervals determined by the setting of a solid-state delay relay 149 (FIG. 14). Other advantageous embodiments of this invention include the following modifications. First, the frequency of bubble introduction can be controlled more accurately by a PIC computer connected to a number pad. Second, the size of the bubble can be controlled more closely through the use of sensors attached to the PIC computer rather than by simply controlling the on-time of the peristaltic pump (the latter is unreliable because, as the number of air bubbles in the sample collection coil increases, so does the resistance to flow—thus bubbles get smaller with time). Another advantageous embodiment substitutes a stepper motor-driven syringe for the peristaltic pump, which also improves control.

Microdialysis Probes

Commercially available microdialysis probes are generally designed to work with a single or dual channel swivel and consist of a single inflow and a single outflow line attached to a flexible microdialysis membrane. Because linear flow rates need to be high to reduce degradation of analytes in the probe, outflow tubing is usually of very small diameter. This makes the probes prone to blockage (e.g. from particles breaking off from the seals in the swivel or from the syringe piston) and results in a system in which the microdialysis membrane is under positive internal pressure. In extreme cases, this causes ultrafiltration of the perfusate and subsequent local tissue damage around the site of implantation.

To eliminate these problems, the microdialysis probes 70 of the present invention are fabricated so that (see FIG. 7) the outflow tube 72 has a relatively wide bore (250 μm) to reduce the pressure on the membrane 75. The membrane 75 is perfused via tube 74 with artificial CSF, as in conventional systems, but an additional inflow tube 73 delivers preservative to mix with the sample immediately above the membrane 75. For monoamines, the preservative consists simply of the low-pH mobile phase used for HPLC, but for peptides, peptidase inhibitors, antibodies or proteins could be added to keep the intact peptide in solution.

A powerful technique in microdialysis is to add a drug or chemical to the perfusate in order to study its local effects on monoamine release. Normally this is achieved by switching syringes, a procedure that can produce artifacts through pressure shocks on the membrane. Accordingly, a third inflow line 71 is added to the probe of the present invention specifically for the purpose of introducing drugs to the perfusate.

Figure 7:
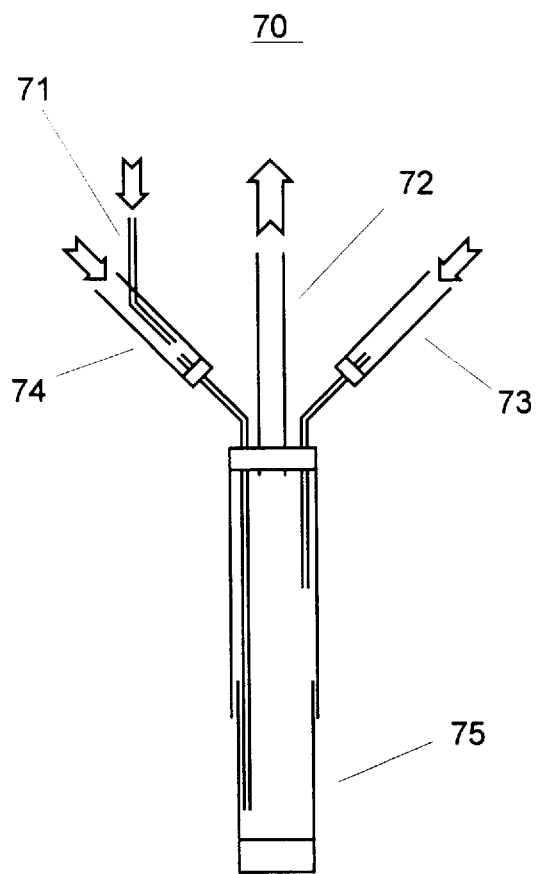
FIG. 7 depicts a schematic of a four-channel microdialysis probe of the present invention.

The probe 70 of the present invention is constructed from two sizes of polyimide-coated fused silica tubing (PolyMicro Technologies) and from regenerated cellulose hollow fiber microdialysis tubing (Spectra/Por RC, 200 $\mu$m i.d., MWCO: 13,000). Delivery tubing is made from PE-10 and from TSP040105 tubing (40 $\mu$m i.d., 105 $\mu$m o.d.) in single lengths to avoid joins. These are glued and sealed into a 40-mm length of TSP250350 (250 $\mu$m i.d., 350 $\mu$m o.d.) as shown in FIG. 7. Active regions are 2.5 mm for dorsal hippocampus and 4 mm for frontal cortex, as described by Abercrombie, E. D. and Finlay, J. M., "Monitoring extracellular norepinephrine in brain using in vivo microdialysis and HPLC-EC. In T. E. Robinson and J. B. Justice (Eds.) *Microdialysis in the Neurosciences*, Elsevier, Amsterdam, 1991, pp. 253–274. After drying, these probes 70 are then washed through with ethanol and water overnight before being checked for leaks, flow rate and in vitro recovery of NE. If satisfactory, the probes 70 are mounted into a tether assembly which consists of Peek tubing attached to a swivel at one end and fitted with a "Soft-Touch" HPLC nut at the end that attaches to the guide cannula.

Much of the work currently being conducted or planned in laboratories involves subtle physiological responses to relatively mild stresses such as noise or the presence of conspecifics. Normal responses to low level stresses can only be detected in the absence of chronic stresses (see Weiss, J. M., Glazer, H. I., Pohorecky, L. A., Brick, J. and Miller, N. E. "Effects of chronic exposure to stressors on avoidance-escape behavior and on brain norepinephrine," *Psychosom. Med.* 37 (1975) 522–533). Therefore, a basic requirement of the turntable system was that it should provide a nonstressful environment for the rat. The criteria for its meeting this requirement are as follows: 1) weight changes in animals in the turntable apparatus must be no different from those housed in the colony; 2) rats in the turntable apparatus must exhibit normal circadian patterns of feeding, drinking and motor activity (normally most of this activity is displayed during specific periods of the dark phase in these nocturnal animals); 3) rats in the turntable apparatus must show normal circadian rhythms of corticosterone secretion (high levels early in the dark phase) and also exhibit increased corticosterone concentrations and increased brain extracellular concentrations of monoamines and monoamine metabolite in response to mild stresses such as noise or the presence of humans. The turntable apparatus of the present invention meets these criteria.

Constant Pressure Perfusion Device

Figure 9:
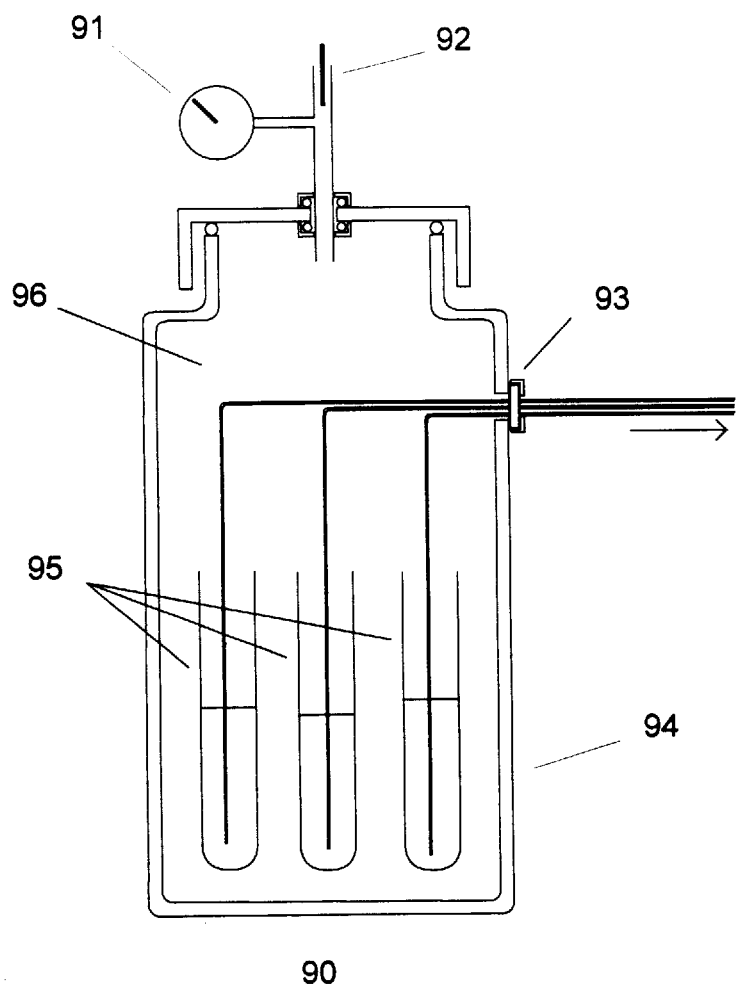
FIG. 9 depicts a constant-pressure perfusion system according to the present invention.

The constant-pressure perfusion device 90 of the present invention shown in FIG. 9 provides a low cost alternative to syringe-pumps and possesses many advantages over the latter under circumstances in which flow resistance is low and relatively constant.

Commercially available syringe pumps used on the turntable for perfusing the microdialysis probes work satisfactorily for periods of up to 24 hours, but at that time, the syringes have to be reloaded. The alternative of using larger syringes and slower pump motors proved unsatisfactory because of poor flow control. Unfortunately, the process of changing a syringe can lead to artifacts created when abrupt pressure changes cause swelling or contraction of the microdialysis membrane, thereby displacing brain tissue, and can also introduce particles into the system that are capable of blocking the microbore tubing used in the probes.

Figure 8:
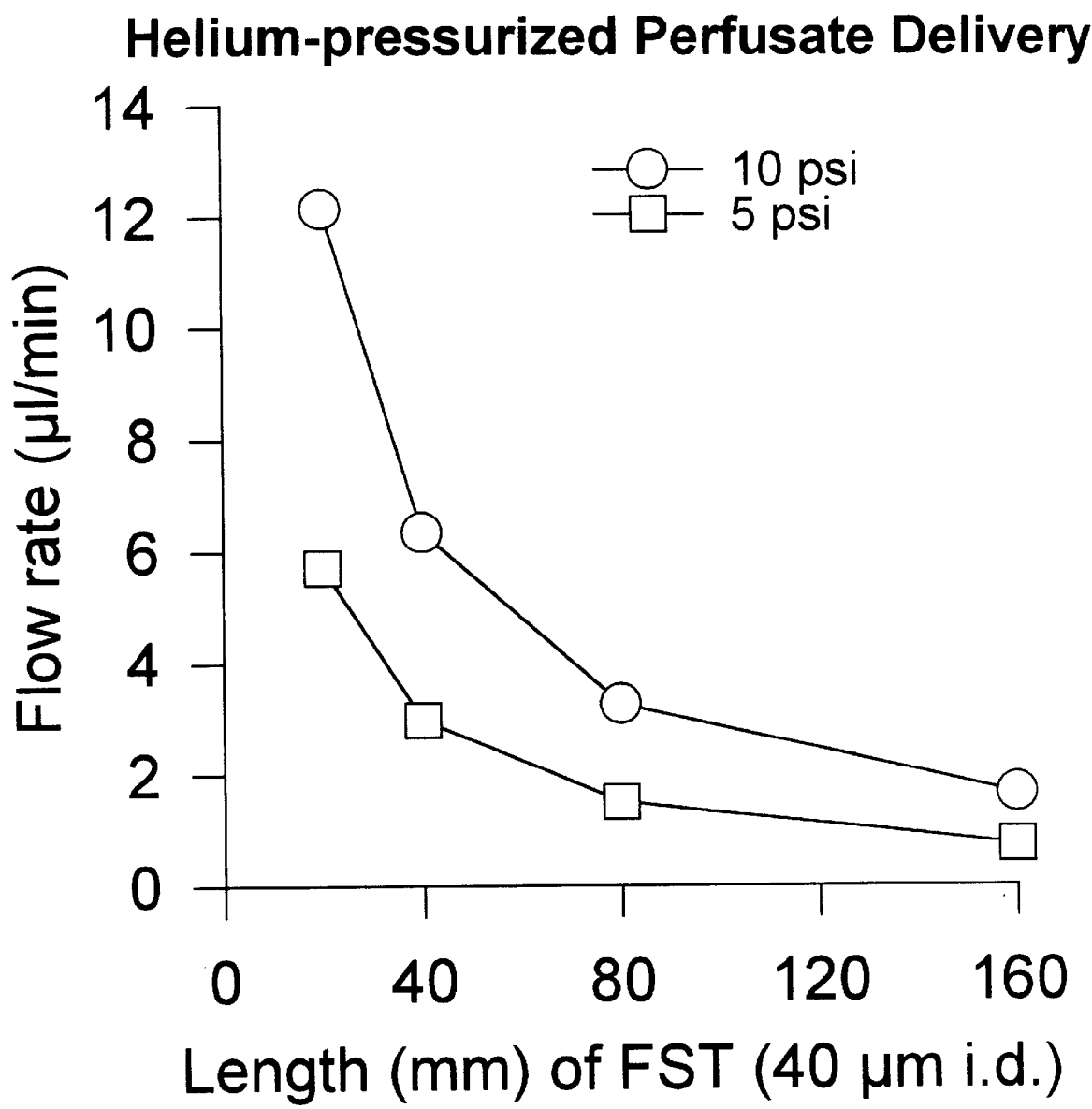
FIG. 8 is a graph of the rate of flow of artificial CSF through increasing lengths of microbore fused silica tubing.

To overcome this problem, the inventors adopted an approach based on fluidic theory. The familiar Ohms Law of electronics (current=voltage divided by resistance) has its equivalent in fluidics: flow=pressure divided by resistance. To obtain the very slow flow rates used in microdialysis, all that is needed is a source of constant pressure and a resistor in the form of a fixed length of very narrow-bore fused silica tubing (FST: 40 $\mu$m i.d.). The relationship between flow rate and tubing length is illustrated in FIG. 8. The constant pressure perfusion device 90 of the present invention (FIG. 9) includes a helium-charged polypropylene bottle 94 containing reservoirs 95 of artificial CSF and preservative sufficient to perfuse one or more probes for several days. The lengths of FST dip directly into the fluid and exit through ports 93 in the side of the bottle 94 where they are attached to the respective inflow lines of the probes. Because the volume of the bottle 94 is several orders of magnitude greater than the volume of the liquid discharged, the pressure in the bottle 94 remains steady.

An important consideration in the design of perfusion systems for microdialysis is the safety of the animal. Conventional syringe pumps are capable of generating pressures of the order of several atmospheres. If the outflow from a microdialysis probe becomes blocked (a not infrequent occurrence with conventional designs), this entire pressure is then applied to the fragile dialysis membrane, which may burst within the animal's brain. With the constant pressure pump 90 of the present invention, the maximum pressure that can be applied to the membrane is only 5 or 10 psi, which is not sufficient to burst a membrane. Not only is this multichannel perfusion device 90 far simpler and less costly than commercially available syringe pumps but, with respect to the needs of microdialysis, performance is in many respects superior.

Infrared Activity Monitors

In order to be able to relate neurochemical events to behavior, according to another aspect of the present invention, the cages are equipped with infrared beams to monitor horizontal movement, rearing, and access to food and water. The infrared system is controlled by a PIC computer with total beam breaks displayed on LCD panels. For more sophisticated analysis, however, the raw activity data is uploaded to a personal computer and is combined with the rotational activity data detected through the tether.

Automated Blood Withdrawal System

Although microdialysis offers many advantages over blood withdrawal for measuring hormone or drug levels, some hormones, notably peptide hormones, cannot be measured using current methods of dialysis. Manual blood sampling is very stressful to the animal and cannot be used for fast-reacting substances such as blood catecholamines and ACTH. Remote sampling systems using indwelling venous or arterial cannulae have been much used for measuring stress hormones and circadian endocrine rhythms that would be disrupted by manual methods.

According to the present invention, a fully automated blood sampling system can be used in conjunction with the turntable to solve this problem. The main problem in remote sampling is blockage of the cannulae by blood clots—particularly small fibrous masses that form at the end of the cannula and act as a one-way valve. The normal method of preventing clot formation is to backfill the cannula with anticoagulant between samples and to provide a very slow anticoagulant drip to keep the cannula tip free without heparinizing the whole animal. The present invention uses three stepper motor-driven syringes and a cooled sample coil to store the samples (see above). The indwelling cannula is attached to one end of the coil and the main withdrawal syringe is attached to the other end. A second syringe is filled with anticoagulant which it delivers via a concentric inner cannula to a point about 1 mm from the tip of the main cannula. The third syringe delivers a suitable preservative solution (e.g. acid, antioxidant, peptidase inhibitor or even antibody) into the body of the cannula. All stepper motors are controlled by a PIC computer activated by an external PC via infrared signals. The withdrawal sequence proceeds as follows:

(1) sample withdrawal—the main syringe withdraws at a rate faster than the delivery rate of the anticoagulant and preservative. In this case, total volume withdrawn=volume of preservative+volume of anticoagulant+internal volume of cannula+sample volume.

(2) cannula backfill—the main syringe withdrawal rate equals coagulant delivery rate. In this case, total volume=internal volume of cannula;

(3) anticoagulant drip—no main syringe or preservative syringe motion. In this case, the anticoagulant flow rate=about 1 $\mu$l/min by intermittent pulsing of the stepper motor.

Blood samples prepared in this way are stored in the sample coil between bands of anticoagulant. Because the blood will be diluted with anticoagulant and preservative, extraction may be necessary before analyzing the component of interest. Results can be expressed relative to the hemoglobin or creatinine concentration.

Automated Drug Delivery

The prototype turntable and tether system described above already incorporates a cannula which is used for the remote intraperitoneal delivery of drugs. However, this has to be performed manually by the experimenter, which necessitates briefly inactivating the turntable and injecting the drug into the cannula, which is sometimes at inconvenient times of night. An automated system is preferred.

The present invention provides a device consisting of two stepper-motor activated syringes controlled by a PIC computer. One syringe (which could be kept ice cold if necessary by fluid from the sample collector cooling system) contains a solution of the drug; the second syringe contains normal saline (or artificial CSF for intracerebral delivery) and both are connected to the head of the cannula by a Tee. In this case, the delivery sequence consists of the following:

(1) delivery of the required volume of drug solution into the cannula;

(2) delivery of a volume of saline into the cannula equivalent to 110% of the internal volume of the cannula.

By this means diffusion of drug out of the cannula between delivery episodes is avoided. To keep volumes low enough for intracerebral delivery, the cannula is constructed from FST (40 mm inner diameter) and flow rates are in the range of 1 $\mu$l/min.

Data Communication with a Dedicated PC

The PIC computers that are used to control the turntable movement, sample collector and activity monitor are extremely cheap (less than $50) and are designed to be very rugged and reliable. The turntable is fully functional without the need to attach it to a PC, however, for more sophisticated timing of drug infusions and sample collection, the present invention also includes a PC interface. In this arrangement, several PIC computers are linked together via a linear token network that can communicate with a main PC via its serial communications port.

The PIC computer on the turntable requires a more specialized interface consisting of a two-way infrared transmission link. Customized software on the PC (possibly running within a spreadsheet) gathers activity data, information on the amount of rotational movement, and provides a countdown to the next sample "change." Timed infusions of drugs via the dialysis probes or via indwelling catheters can also be controlled by the PC.

Methods for Sampling Neuropeptides

Measuring release of neuropeptides in the brain has importance to many fields of neuroscience, including neuroendocrinology, neuroimmunology and the study of feeding behavior and reward systems. Unfortunately, microdialysis has not provided an easy way to do this because rates of recovery of most peptides are very low. The inventors have a particular interest in the release of the peptide galanin in the ventral tegmental area because it has been hypothesized to represent an important link between the noradrenergic and dopaminergic systems (see Weiss, J. M., Demetrikopoulos, M. K., West, C. H. K. and Bonsall, R. W., Hypothesis linking the noradrenergic and dopaminergic systems in depression. *Depression* 3: 225245, 1996).

A previous method for estimating release of peptides in brain was push-pull cannulation in which samples of extracellular fluid were collected with a double, concentric cannula. The rate of fluid inflow had to be exactly balanced against the rate of fluid withdrawal. However flow rates were between 10 and 100 times higher than those commonly used in microdialysis, and the procedure often created lesions that made the interpretation of results difficult.

To solve this problem, the present invention includes a push pull/microdialysis hybrid that is used in conjunction with the turntable to sample extracellular levels of the peptides. Probes built for this purpose resemble concentric microdialysis probes but lack membranes. The key is to regulate the inflow and outflow at about 0.5 $\mu$l/min in such a way as to produce a zero pressure difference between brain and perfusate. The use of low pressure delivery and sampling systems minimizes the possibility of creating brain lesions, but more sophisticated remote sensing of the pressure and control of withdrawal rate may often be necessary. The sample collector consists of a rotating valve that diverts fixed volumes of sample into a storage coil.

Simultaneous Electrophysiology and Microdialysis

One of the most exciting possibilities presented by the turntable device of the present invention is the simultaneous use of electrophysiology to monitor neuronal activity and microdialysis to measure the release of neurotransmitters. Many of the technical problems inherent in electrophysiological studies on alert, freely moving animals (e.g. maintaining electrode position) have already been addressed by others (see Lemon R. *Methods for Neuronal Recording in Conscious Animals*. IBRO Handbook Series: Methods in The Neurosciences, Vol. 4 (A. D. Smith ed.) John Wiley and Sons, New York, 1984).

Multiple floating-wire electrode assemblies (e.g. Kosobud, A. E. K., Harris, G. C. and Chapin, J. K., "Behavioral associations of neuronal activity in the ventral tegmental area of the rat," *J Neurosci*. 14 (1994) 7117–7129) are particularly suited to the multichannel capability of the turntable, which eliminate the need for a commutator. Thus, the present invention preamplifies the signal using head-mounted op-amps and then processes and digitizes the signal on the turntable. The digital data is then transmitted to a PC using IR or RF methods. One technical problem is the generation of electrical noise by the stepper motor (although this is located about four feet away from the unamplified signal). Shielding or digital filtering helps, as might microstepping the motor, but if necessary, the signal can simply be chopped during the intermittent operation of the motor. Other embodiments employ cyclic voltammetry, which is relatively simple to perform intracranial self-stimulation (ICSS) in experiments on reward systems.

Applications to Smaller or Larger Animals

The turntable of the present invention was initially designed for use with laboratory rats, and has applications for animals in the 150 to 800 g range. The inertia of the tether-sensor assembly becomes significant for smaller animals such as hamsters and mice. However, there are some studies in which smaller rodents might be preferred, for example, the use of mice in neuroimmunology. For such purposes, miniaturization of the sensor is necessary. For larger animals such as primates and ungulates, on the other hand, a larger, stronger tether could be developed, but this may not be necessary. The novel designs for infusion pumps and sample collectors described above can be mounted in a self-contained back-pack as readily as on a turntable. This provides, for the first time, a relatively inexpensive and reliable means of obtaining multisite samples of biological fluids from untethered animals in social situations. Applications to studies with humans are also possible.

Multichannel Sample Collection & Drug Delivery System

The multichannel automatic sample collection and drug delivery system of the present invention includes each of the above described parts, i.e., a turntable adjustable tether, a coil sample collection device, a constant pressure perfusion device and a multichannel microdialysis probe for each animal under observation.

What is claimed is:

1. A sample collection device comprising:
    a) a coil of flexible tubing, one end for coupling to a sample site;
    b) a timer; and
    c) a pump coupled to the other one end of the coil, wherein at preset intervals controlled by said timer said pump draws a sample from the sample site into the coil followed by a bubble of gas to keep successive samples separate in the coil until the samples are removed for analysis.

2. The device according to claim 1, further comprising a cooling device surrounding the coil.

3. The device according to claim 2, wherein said cooling device comprises:
    a) a reverse thermocouple cooling system;
    b) a thermistor sensor; and
    c) a computer being coupled to the thermistor and controlling the reverse thermocouple cooling system.

4. The device according to claim 1, further comprising a gas reservoir coupled to one end of said coil.

5. The device according to claim 4, wherein said gas includes at least one of the noble gases from the group consisting of helium, argon, neon, xenon, krypton, and radon.

6. The device according to claim 4, wherein said gas includes at least one of the group consisting of nitrogen, air, or oxygen.

7. The device according to claim 1, further comprising a solid-state delay relay maintaining successive samples separate by introducing gas bubbles at regular intervals.

8. The device according to claim 1, further comprising a computer controlling a frequency of bubble introduction.

9. The device according to claim 8, further comprising a plurality of sensors coupled to the computer for controlling a size of the bubble.

10. The device of claim 1, further comprising:
    a) a membrane coupled to the sampling site; and
    b) a microdialysis probe coupled to the membrane, said probe including:
        (i) a first channel for delivering perfusate to the sampling site, said first channel extending into the membrane;
        (ii) a second channel for delivering a preservative to mix with the sample immediately after the fluid sample enters the probe; and
        (iii) a third channel for coupling to the coil of flexible tubing and receiving the fluid sample, wherein the third channel has a relatively wide bore as compared to the other channels.

11. The device according to claim 10, further comprising a fourth channel for delivering a drug to the sample site.

12. The device according to claim 10, wherein the first channel further comprises a tube for delivering a drug with the perfusate to the sample site.

13. The apparatus according to claim 10, wherein said bore has a diameter of approximately 250$\mu$ meters.

14. The device according to claim 10, wherein the preservative includes low-pH mobile phase used for HPLC for monoamines.

15. The device according to claim 10, wherein the preservative includes peptidase inhibitors, antibodies or proteins.

16. An automated fluid sampling system for obtaining samples from a living organism comprising:
    a) a coil of tubing;
    b) an indwelling cannula attached to the living organism, and also attached to one end of the coil, said indwelling cannula having a main cannula with a tip, a body and an concentric inner cannula;
    c) a first syringe attached to the other end of the coil;

d) a second syringe filled with an anticoagulant and being coupled to the indwelling cannula via the concentric inner cannula, wherein said second syringe delivers said anticoagulant via the concentric inner cannula to a point about 1 mm from the tip of the main cannula;

e) a third syringe being coupled to the indwelling cannula via the body of the indwelling cannula, and delivering a preservative solution into the body of the cannula;

f) an external computer transmitting an activation signal;

g) three stepper motors, one coupled to each of the syringes; and h) a microcomputer receiving the activation signal from the external computer and controlling the three stepper motors according to the activation signal.

17. The system according to claim 16, wherein the system performs the following withdrawal sequence:

a) the first syringe withdraws a sample at a rate faster than the delivery rate of the anticoagulant and preservative, whereby a total volume withdrawn=volume of preservative+volume of anticoagulant+internal volume of cannula+sample volume;

b) to backfill the cannula, the main syringe is withdrawn at a withdrawal rate=coagulant delivery rate, wherein total volume=internal volume of cannula;

c) to perform an anticoagulant drip, there is no main syringe or preservative syringe motion, and the anticoagulant flow rate=about 1 $\mu$l/min by intermittent pulsing of the appropriate stepper motor.

18. The device according to claim 16, wherein samples are stored in the sample coil between bands of anticoagulant.

* * * * *

UNITED STATES PATENT AND TRADEMARK OFFICE
CERTIFICATE OF CORRECTION

PATENT NO. : 5,865,766
DATED : February 2, 1999
INVENTOR(S) : Robert Wingfield Bonsall, Milburn Spencer Emery and Jay Michael Weiss It is certified that error appears in the above-identified patent and that said Letters Patent is hereby corrected as shown below:

Column 1,
Line 5, immediately following the title, please insert the following paragraph
-- The subject matter of the present invention was supported in part by the United States National Institute of Health Grant Nos. MH42088, MH50420 and MH51761. --

Signed and Sealed this

Twenty-sixth Day of July, 2005

JON W. DUDAS
*Director of the United States Patent and Trademark Office*